Sept. 23, 1969    E. HUGUES    3,468,600
WIDE ANGLE SHORT PHOTOGRAPHIC OBJECTIVES
Filed Nov. 10, 1966
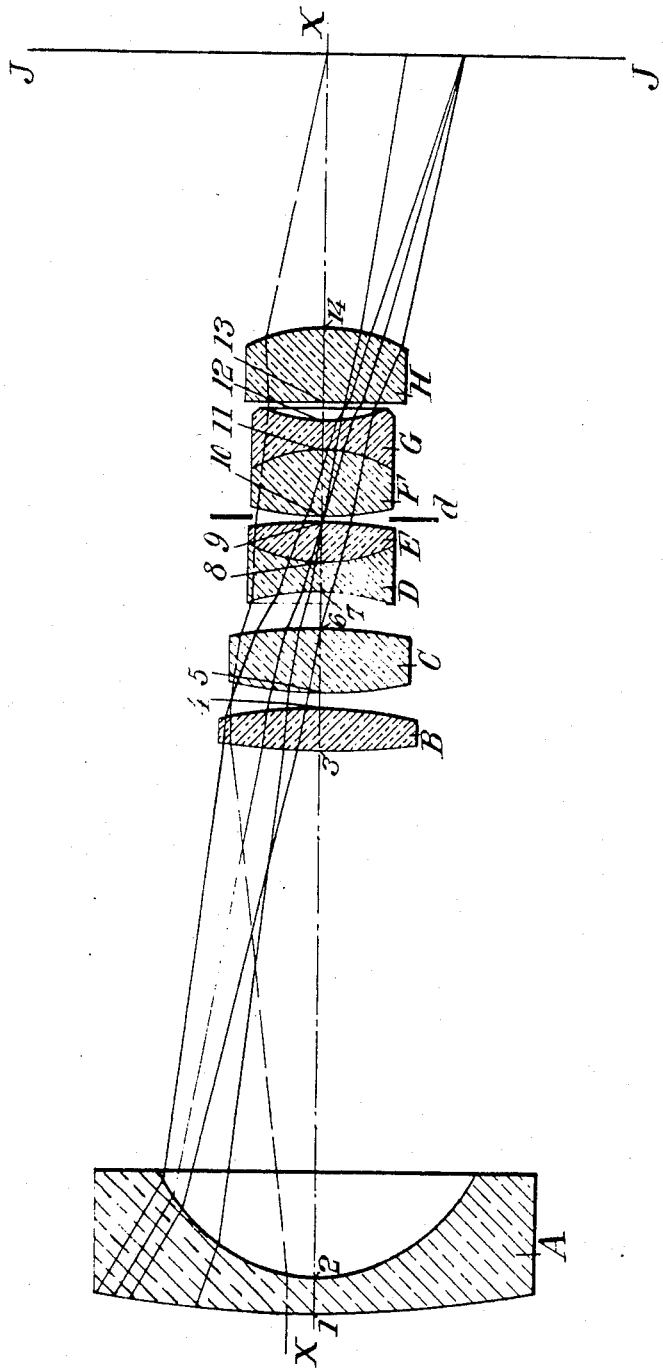
INVENTOR
EDGARD HUGUES
BY William D. Stokes
ATTORNEY United States Patent Office 3,468,600
Patented Sept. 23, 1969

3,468,600
WIDE ANGLE SHORT PHOTOGRAPHIC OBJECTIVES
Edgard Hugues, 8 Rue Leon Boursier, 92 Courbevoie, France
Filed Nov. 10, 1966, Ser. No. 593,375
Claims priority, application France, Nov. 17, 1965, 38,802
Int. Cl. G02b 3/04, 9/62
U.S. Cl. 350—189                                                    1 Claim

ABSTRACT OF THE DISCLOSURE

The wide angle composite lens or objective comprises: a first dioptrical system including a lens having an at least approximately flat front surface and a rear surface in the form of a portion of an ellipsoid, this system being adapted to give a virtual image, this system having an optical axis; a diaphragm disposed in a plane perpendicular to said optical axis, at the place of the ellipsoid focus located at the greater distance from said lens; and a second dioptrical system including several lenses and disposed in the vicinity of said diaphragm, this second system being adapted to give a real image of said virtual image at the rear thereof.

---

The present invention relates to wide angle objecitves. It is more especially concerned with objectives of relatively small length adapted to be used not only on moving picture and television cameras, but also on photographic cameras, especially of the reflex type.

The chief object of this invention is to provide improvements in wide angle objectives, in particular concerning both the quality of the image, especially from the point of view of uniformity of illumination, even on the edge of the field and from that of the reduction of length of the objective.

The French Patent No. 1,183,489 filed Sept. 27, 1957 related to a photographic objective for moving picture and television cameras including three distinct successive dioptrical groups, to wit, in the direction of travel of light, a first dioptrical group having a negative focal length (of value $-f_1$) one of the lenses of which is in the form of a paraboloid having its concavity turned in the direction opposed to that of light, a second dioptrical group having a positive focal length (of value $f_2$), the whole of these two first groups being adapted to constitute an afocal system or to give an image at finite distance and having a pupil located at the rear of the second group, and a third group made substantially as an objective of conventional type.

In this definition:

The term "optical group" meant either a single lens or a group of lenses either separate or glued together, The expression "direction of light" was the direction corresponding to the utilization of the objective for taking pictures, and The term "pupil of a dioptrical group" meant the image of the diaphragm of the objective with respect to the lenses located between this diaphragm and the group in question.

Now, it has been found that it is possible to make shorter wide angle objectives by the combination of two dioptrical groups or systems the first of which consists of a lens having an ellipsoidal rear surface.

Therefore, according to the present invention, a wide angle objective is made by the combination of:

A first dioptrical system including a lens having a flat front surface, or possibly a slightly convex or concave front surface, and a rear surface in the form of a portion of an ellipsoid, this system giving a virtual image in its image plane.

A diaphragm disposed in the plane perpendicular to the optical axis at the place of the focus of the ellipsoid located at the greater distance from the lens, and A second dioptrical system including several lenses and disposed in the vicinity of the diaphragm, this second system being adapted to produce a transfer toward the rear of the virtual image given by the first dioptrical system and giving a real image in the plane JJ of the receiver, which is, for instance, a photographic film.

Such an objective has the advantage of being both of the wide angle type and very short since it comprises only two dioptrical groups or systems.

Furthermore, due to the fact that the rear surface of the lens of the first dioptrical group is a portion of an ellipsoid and that the diaphragm is disposed at the focus of the ellipsoid located at the greater distance from said lens, an optical beam entering the objective, even if it makes a great angle with the optical axis, gives, when its cross section tends toward zero, an excellent image, which is not the case with other surfaces. There is thus obtained a stigmatism for any radius, even having a great inclination, the sagittal and tangential focal lines coinciding together for this radius, and not a stigmatism within the scope of the conventional approximation of Gauss (for radii little inclined with respect to the axis).

Furthermore, the lens of the first dioptrical system the optical aberrations of which are corrected by the second dioptrical system has pupillary or photometric aberrations (that is to say gradually "expands" the entrance pupil as the distance from the optical axis increases) such that the illumination E of the final real image (in the plane of the receiver consisting either of a cinematographic film or of the mosaic of a television view taking tube) of an elementary area $ds$ of the object seen under an angle $b$ from the optical axis is of the order of $Eo \cos b$, if $Eo$ is the illumination of the final image of an area of the object of the same size and luminance as area $ds$, but which would be seen under an angle $b=0$, instead of the usual law $E = Eo \cos^4 b$, thus ensuring a more uniform illumination of the image for an object of constant luminance.

Finally, an objective according to the present invention has a great optical draw length, which is advantageous for apparatus of the reflex type, and a great depth of field.

The figure of the drawing shows, in section, by way of example, a particularly advantageous embodiment of such a wide angle objective, for use in a reflex type photographic camera.

In this embodiment the objective comprises:

A first dioptrical system consisting of a lens A having a slightly convex front surface and the rear surface 2 of which is in the form of a portion of an ellipsoid, this lens giving a virtual image in its image plane (on the left of dioptrical surface 1), A diaphragm $d$ disposed in the plane perpendicular to the optical axis XX at the level of the ellipsoid focus at the greater distance from lens A, and A second dioptrical system including several lenses B, C, D, E, F, G, and H, disposed in the vicinity of diaphragm $d$ (the four first lenses B, C, D, E, being disposed in front of the diaphragm, whereas the three last lenses F, G, H are disposed behind it), this second system transferring toward the rear the virtual image produced by the first dioptrical system and giving a real image in the plane JJ of the receiver, which is, for instance, a photographic film.

In the following table are given the thicknesses in millimeters of the respective lenses and of the air layers, the radii in millimeters of the index for the $d$ ray of helium, the Abbe number and the diameter of the lenses, such a diameter having the following characteristics:

| | | |
|---|---|---|
| Focal length | mm | 19 |
| Aperture | | F/2.5 |
| Draw length | mm | 39 |
| Nominal field | degs | 90 |
| Distortion at 30° | percent | 90 |
| Distortion at 45° | do | 3.3 |

| Lenses | Dioptrical surfaces | Thicknesses | Radii | Index | Abbe Number | Diameter |
|---|---|---|---|---|---|---|
| A | 1 | 5.40 | 180.00 | 1.69075 | 54 | 64 |
|   | *2 | 74.70 | 20.785 |   |   |   |
| B | 3 | 5.54 | 151.266 | 1.80000 | 46 | 26 |
|   | 4 | 2.61 | −68.545 |   |   |   |
| C | 5 | 9.00 | 65.568 | 1.62025 | 60 | 26 |
|   | 6 | 5.40 | −99.380 |   |   |   |
| D | 7 | 4.20 | −34.051 | 1.62025 | 60 | 21 |
| E | 8 | 5.86 | 19.478 | 1.51650 | 64 | 21 |
|   | 9 | 0.60 | −69.105 |   |   |   |
| Diaphragm |   | 0.63 |   |   |   | 19 |
| F | 10 | 9.00 | 50.868 | 1.51650 | 64 | 20 |
| G | 11 | 4.50 | −20.962 | 1.73150 | 28 | 20 |
|   | 12 | 2.70 | 25.972 |   |   |   |
| H | 13 | 10.47 | −518.411 | 1.72000 | 50 | 21 |
|   | 14 |   | −20.539 |   |   |   |

*Ellipse, x=0.55.

In a general manner, while the above description discloses what is deemed to be a practical and efficient embodiment of the present invention, said invention is not limited thereto as there might be changes made in the arrangement, disposition and form of the parts without departing from the principle of the invention.

What I claim is:

1. Wide angle objective characterized by the following characteristics:

Focal length _____mm__ 19
Aperture _____ F/2.5
Draw length _____mm__ 39
Nominal field _____degs__ 90

| Elementary Lenses | Dioptrical surfaces | Thicknesses | Radii | Index | Abbe Number | Diameter |
|---|---|---|---|---|---|---|
| A | 1 | 5.40 | 180.00 | 1.69075 | 54 | 64 |
|   | *2 | 74.70 | 20.785 |   |   |   |
| B | 3 | 5.54 | 151.266 | 1.80000 | 46 | 26 |
|   | 4 | 2.61 | −68.545 |   |   |   |
| C | 5 | 9.00 | 65.568 | 1.62025 | 60 | 26 |
|   | 6 | 5.40 | −99.380 |   |   |   |
| D | 7 | 4.20 | −34.051 | 1.62025 | 60 | 21 |
| E | 8 | 5.86 | 19.478 | 1.51650 | 64 | 21 |
|   | 9 | 0.60 | −69.105 |   |   |   |
| Diaphragm |   | 0.63 |   |   |   | 19 |
| F | 10 | 9.00 | 50.868 | 1.51650 | 64 | 20 |
| G | 11 | 4.50 | −20.962 | 1.73150 | 28 | 20 |
|   | 12 | 2.70 | 25.972 |   |   |   |
| H | 13 | 10.47 | −518.411 | 1.72000 | 50 | 21 |
|   | 14 |   | −20.539 |   |   |   |

*Ellipse, x=0.55.

References Cited

UNITED STATES PATENTS 3,037,426  6/1962  Hugues _____ 350—192

FOREIGN PATENTS 384,879  11/1923  Germany.
149,905  1962  Russia.

JOHN K. CORBIN, Primary Examiner

U.S. Cl. X.R.

350—215